United States Patent [19]
Lei et al.

[11] Patent Number: 5,979,243
[45] Date of Patent: Nov. 9, 1999

[54] MICROFABRICATED MULTIFUNCTION STRAIN-TEMPERATURE GAUGE

[75] Inventors: Jih-Fen Lei, Westlake; Gustave C. Fralick, Middleburg Heights; Michael J. Krasowski, Chagrin Falls, all of Ohio

[73] Assignee: The United States of America as represented by the Secretary of the Army, Washington, D.C.

[21] Appl. No.: 09/087,147

[22] Filed: May 29, 1998

[51] Int. Cl.$^6$ .............................. G01L 2/00; G01L 19/00
[52] U.S. Cl. ......................... 73/766; 73/862.623
[58] Field of Search ............... 73/766, 765, 763, 73/777, 862.622, 862.623

[56] References Cited

U.S. PATENT DOCUMENTS

| | | | |
|---|---|---|---|
| 3,956,927 | 5/1976 | Pearson | 73/766 |
| 5,056,374 | 10/1991 | McMennamy et al. | 73/862.382 |
| 5,375,474 | 12/1994 | Moore Sr. | 73/766 |
| 5,734,110 | 3/1998 | Kosmal | 73/766 |
| 5,780,746 | 7/1998 | Brady | 73/766 |

OTHER PUBLICATIONS

Advances in Thin Film Sensor Technologies for Engine Applications, Jih–Fen Lei, Army Research Laboratory, NASA Lewis Center, Lisa C. Martin and Herbert A. Will, NASA Lewis Research Center 6 p., Jun. 1997.

*Primary Examiner*—Max Noori
*Attorney, Agent, or Firm*—Paul S. Clohan

[57] ABSTRACT

The instant invention is for a microfabricated sensor system that can measure temperature, principle strain level, and its relative strain orientation simultaneously. It is a multifunctional, small size, low mass, and space saving gauge.

4 Claims, 4 Drawing Sheets

MICROFABRICATED MULTIFUNCTION STRAIN-TEMPERATURE GAUGE

BACKGROUND OF THE INVENTION

1. Field of the Invention

This invention relates to the field of high temperature measurement of strain magnitude, temperature, and principle strain angle simultaneously, while at the same time minimizing the size, space, weight, and mass of the sensor.

2. Description of the Related Art

Currently the field of sensor applications for aeropropulsion systems does not have a combination strain gauge and temperature sensor. There are presently urgent needs in aeronautic and aerospace research where stress and temperature gradients are high and aerodynamic effects need to be minimized for sensors which are minimally intrusive.

SUMMARY OF THE INVENTION

The proposed sensor system can measure temperature (T), principle strain level ($\epsilon_M$), and its relative orientation ($\theta$) simultaneously. This invention has small size and low mass, i.e. using thin film process, the size of the sensor is much smaller than the conventional wire sensor and since the thin film sensor is only about a micron thick, it has negligable mass.

BRIEF DESCRIPTION OF THE DRAWING FIGURES

INCORPORATION OF PUBLICATION CONCERNING ART

The article entitled "ADVANCES IN THIN FILM SENSOR TECHNOLOGIES FOR ENGINE APPLICATIONS" by Jih-Fen Lei, June 1997, is incorporated herein and is an integral part of this application.

DETAILED DESCRIPTION OF THE PREFERRED EMBODIMENT

The proposed sensor 10 system can measure temperature (T), principle strain level ($\epsilon_M$) and its relative orientation ($\theta$) simultaneously. The benefit of this proposed sensor is its:

(1) multifunction—measure three parameters simultaneously from one single source.

(2) small size—using this film process, the size of the sensor can be much smaller than the more conventional wire sensor.

(3) low mass—thin film sensor is only microns thick, therefore it has negligable mass.

(4) space/cost saving—instead of having two separate sensor systems measuring temperature and strain independently, only one single sensor is used, this saves a lot of space and cost for sensor instrumentation.

Figure 1:
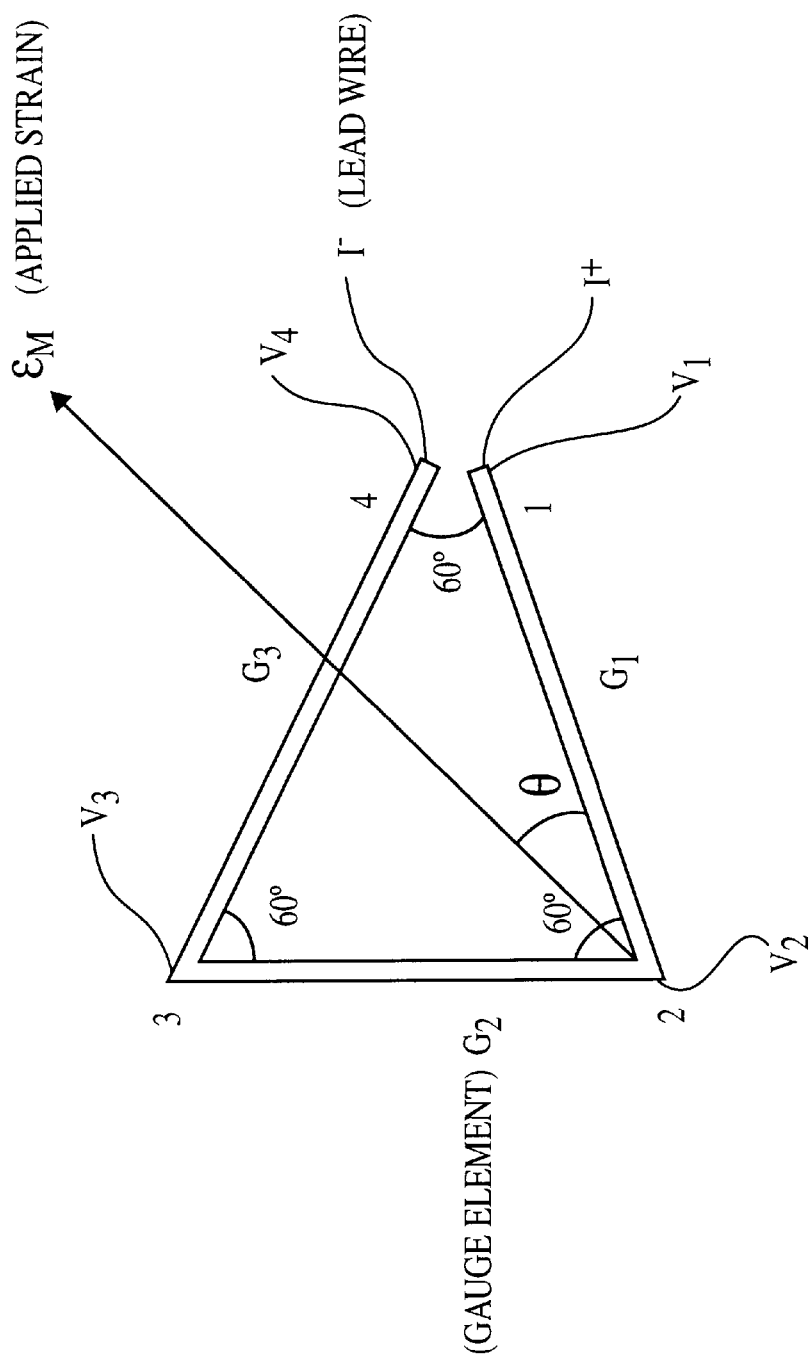
FIG. 1 shows the main components of the sensor system.

Sensor Configuration:

Referring to FIG. 1, it is seen that the sensor system 10 has a triangular shape composed of three gauge elements. G1 between points 1 and 2, G2 between points 2 and 3, and G3 between points 3 and 4. The length and size (and therefore the electrical resistance) of the three gauge elements should be the same. The angles between these gauge elements should all be 60 degrees. The sensor system 10 can be made of various materials; however, precious metals such as Pt and Pd-Cr are the materials of choice for high temperature applications. This is due to their excellent oxidation resistance, high melting temperature and good adhesion to high temperature test components.

There should be six wires attached to the sensor system, two for the current source 20 attached to points 1 and 4, and four wires for the voltage drop measurements ($V_{12}$, $V_{23}$, and $V_{34}$) of the three gauge elements, one of each between points 1 and 2, 2 and 3, and 3 and 4.

OPERATING PRINCIPLE:

When there is a strain (with its principle strain level $\epsilon_M$ oriented at an angle $\theta$ relative to the gauge element $G_1$) applied to the gaged test article at temperatures, the strain levels that the three gauge elements ($G_1$, $G_2$, $G_3$) of the sensor system experience can be expressed as follows:

$$\epsilon_{G_2} = \epsilon_M \cos(60° - \theta) + \epsilon_{app} = \epsilon_M \left(\frac{1}{2}\cos\theta + \frac{\sqrt{3}}{2}\sin\theta\right) + \epsilon_{app} \quad (2)$$

$$\epsilon_{G_3} = \epsilon_M \cos[\pi - (60° + \theta)] + \epsilon_{app} = \epsilon_M \left(-\frac{1}{2}\cos\theta + \frac{\sqrt{3}}{2}\sin\theta\right) + \epsilon_{app} \quad (3)$$

where $\epsilon_{app}$ is the apparent strain or the thermally induced strain.

Since the three gauge elements are made of the same material, and because the size of the sensor system is small enough that the three gauge elements should experience the same temperature changes, we can therefore assume that all three gauge elements have the same apparent strain $\epsilon_{app}$. This is possible when one utilizes thin film microfabrication techniques.

Rearrange equations 1–3 into a matrix as:

$$\begin{pmatrix} \epsilon_{G_1} \\ \epsilon_{G_2} \\ \epsilon_{G_3} \end{pmatrix} = \begin{pmatrix} 1 & 0 & 1 \\ \frac{1}{2} & \frac{\sqrt{3}}{2} & 1 \\ -\frac{1}{2} & \frac{\sqrt{3}}{2} & 1 \end{pmatrix} \begin{pmatrix} \epsilon_M \cos\theta \\ \epsilon_M \sin\theta \\ \epsilon_{app} \end{pmatrix}$$

Reverse the matrix as:

$$\begin{pmatrix} \epsilon_M \cos\theta \\ \epsilon_M \sin\theta \\ \epsilon_{app} \end{pmatrix} = \begin{pmatrix} 0 & 1 & -1 \\ -\frac{2}{\sqrt{3}} & \sqrt{3} & -\frac{1}{\sqrt{3}} \\ 1 & -1 & 1 \end{pmatrix} \begin{pmatrix} \epsilon_{G_1} \\ \epsilon_{G_2} \\ \epsilon_{G_3} \end{pmatrix}$$

then, $$\epsilon_M \sin\theta = -\frac{2}{\sqrt{3}} \epsilon_{G_1} + \sqrt{3} \epsilon_{G_2} - \frac{1}{\sqrt{3}} \epsilon_{G_3} \quad (5)$$

Since, by definition, $$\epsilon = \frac{\Delta R}{R_o GF}$$

($\Delta R$: Change in resistance from $R_O$)
(GF is the gauge factor or the strain sensitivity of the gauge element), and a constant current source 20 is used in the measurement circuit, then $$\epsilon = \frac{\Delta R}{R_o GF} = \frac{\Delta V/I}{V_o/IGF} = \frac{\Delta V}{V_o GF}$$

We can now rewrite equations 4–6 as $$\epsilon_M \cos\theta = \epsilon_{G2} - \epsilon_{G3} = \left(\frac{\Delta V_{23}}{V_{23}} - \frac{\Delta V_{34}}{V_{34}}\right)\frac{1}{GF} \quad (7)$$

$$\epsilon_M \sin\theta = \frac{-2}{\sqrt{3}}\epsilon_{G1} + \sqrt{3}\epsilon_{G2} - \frac{1}{\sqrt{3}}\epsilon_{G3} = \quad (8)$$
$$= \frac{-1}{\sqrt{3}}\left(\frac{2\Delta V_{12}}{V_{12}} - \frac{3\Delta V_{23}}{V_{23}} + \frac{\Delta V_{34}}{V_{34}}\right)\frac{1}{GF}$$

$$\epsilon_{app} = \epsilon_{G1} - \epsilon_{G2} + \epsilon_{G3} = \left(\frac{\Delta V_{12}}{V_{12}} - \frac{\Delta V_{23}}{V_{23}} + \frac{\Delta V_{34}}{V_{34}}\right)\frac{1}{GF} \quad (9)$$

Knowing the gauge factor (GF) of the gauge element, and by measuring the voltage drops across the gauge elements G1($\Delta V_{12}$), G2($\Delta V_{23}$) and G3($\Delta V_{34}$), we can determine $\epsilon_M \cos\theta$, $\epsilon_M \sin\theta$, and $\epsilon_{app}$, and therefore the $\epsilon_M$ (The principle strain level) and (orientation). This is because $$\epsilon_M = \sqrt{(\epsilon_M \cos\theta)^2 + (\epsilon_M \sin\theta)^2} \text{ and } \theta = \cos^{-1}\left(\frac{1}{\epsilon_M}\left[\frac{\Delta V_{23}}{V_{23}} - \frac{\Delta V_{34}}{V_{34}}\right]\frac{1}{GF}\right)$$

Also, since by definition $$\epsilon_{app} = \frac{\Delta R_T}{R_o GF} = \frac{1}{\alpha}\frac{\Delta T}{GF}$$

where $\alpha = TCR + (\beta_s - \beta_g) \times GF$. TCR is the temperature coefficient of resistance of the gauge element, and $\beta_s$ and $\beta_g$ are the thermal coefficient of expansion of the substrate and gauge element, respectively. $\Delta T$ is the change in temperature. Then, $$\Delta T = \frac{\epsilon_{app} \cdot GF}{\alpha} = \frac{1}{\alpha}\left(\frac{\Delta V_{34}}{V_{34}} - \frac{\Delta V_{23}}{V_{23}} + \frac{\Delta V_{12}}{V_{12}}\right)$$

Knowing $\alpha$ which is the property of the gauge and substrate materials, and by measuring the voltage drops across the gauge element, one can therefore determine the temperature change.

Figure 2A:
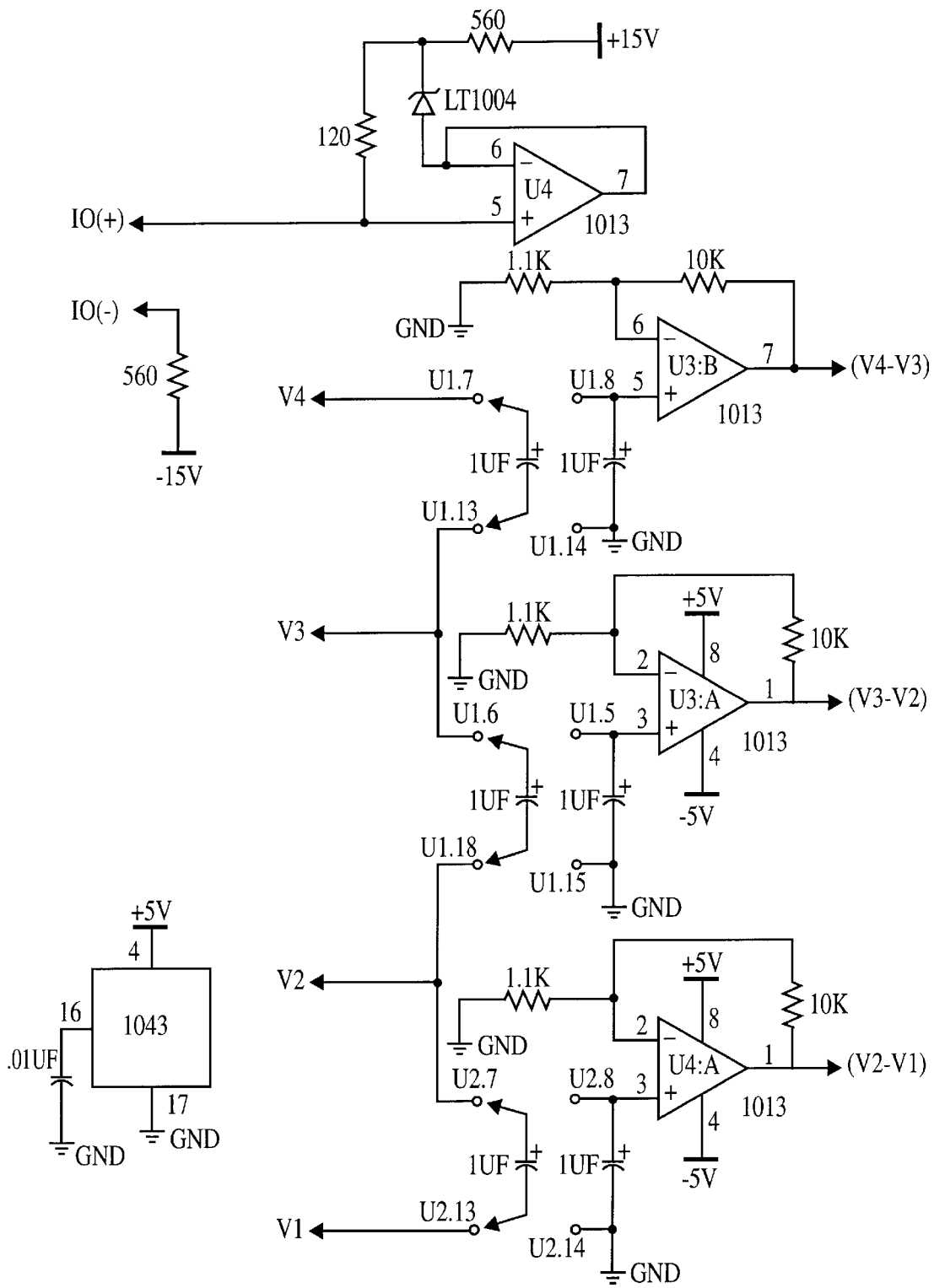
FIG. 2 shows the E-T electrical circuit.
Figure 2B:
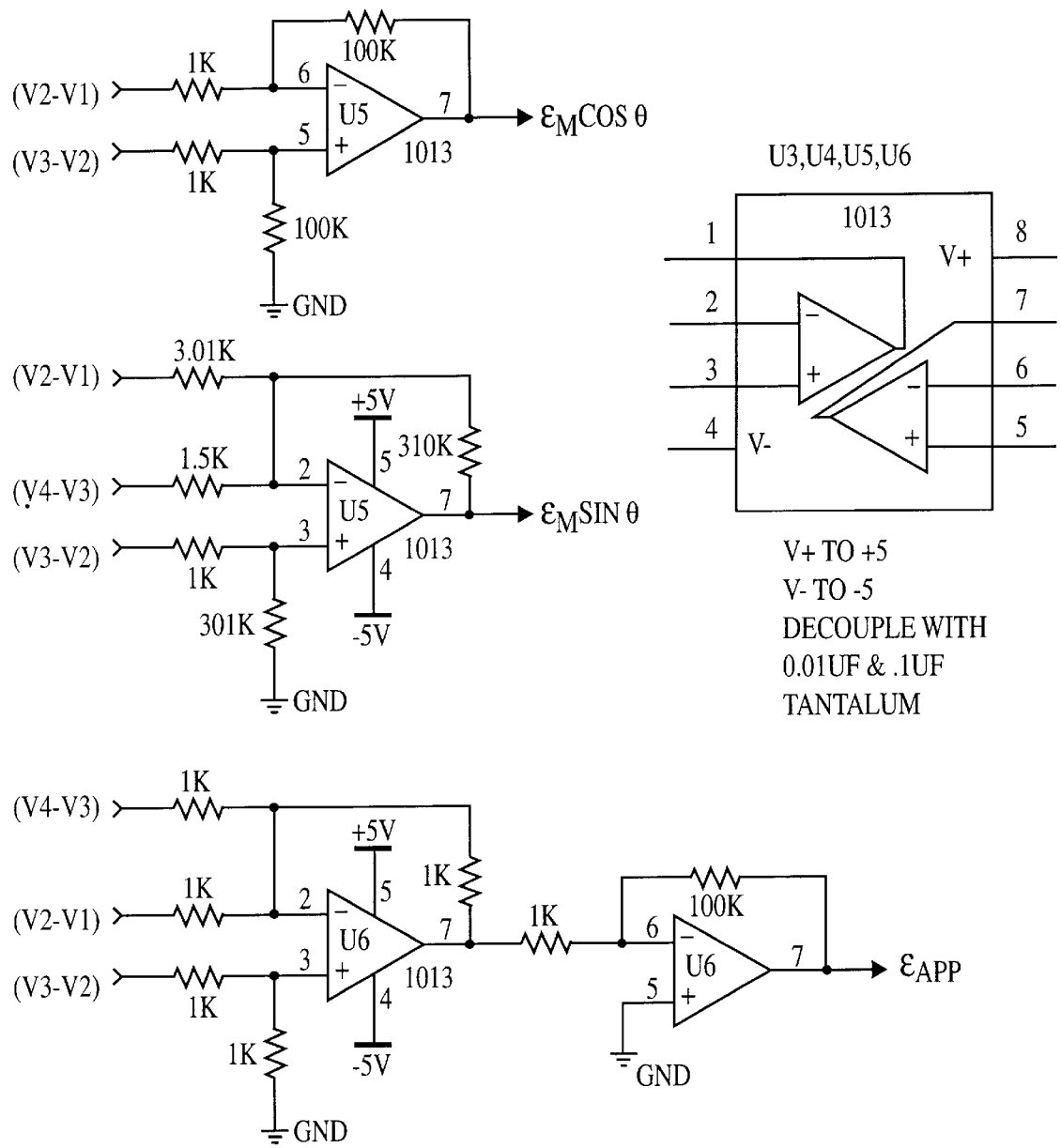
Figure 3:
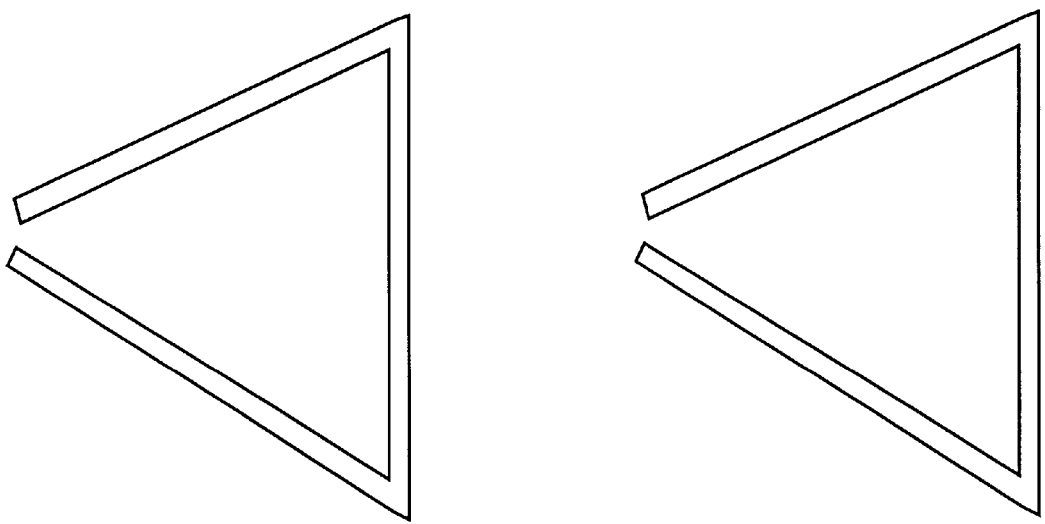
FIG. 3 shows the gauge mask design.

This measurement can easily be done with a simple digital voltmeter or can be implemented with an analog circuit as shown in the attached FIGS. 2A and 2B. The circuit can be a separate unit in the control room or can be fabricated as an ASIC directly on the test article next to the sensor system 10.

We claim:

1. A high temperature, low mass, microfabricated sensor system comprising:

a triangular shaped combination temperature sensor, strain sensor and principle strain angle sensor wherein said temperature, said strain, and said principle strain angle are measured simultaneously;

a first, a second, and a third gauge element arranged in a triangular fashion;

wherein said gauge elements are positioned at 60 degrees to each other thereby forming an equilateral triangle with a first point, a second point, a third point, and a fourth point created at said first point by electrically insulating said first and said fourth point from each other wherein a current source can be connected thereto to said first and said fourth points.

2. The sensor system of claim 1, wherein said first gauge element lies between said first point and said second point, wherein said second gauge element lies between said second and said third point, and said third gauge element lies between said third and said fourth point.

3. The sensor system of claim 1, wherein said first, said second, and said third gauge element comprise thin film precious metals such as Platinum, and Paladium-Chromium alloys.

4. The sensor system of claim 3 wherein the temperature change ($\Delta t$) relates to the temperature coefficient of resistance of said gauge elements (TCR ) and the thermal coefficient of expansion of the substrate ($\beta_s$) and said gauge elements ($\beta_g$) and gauge factor (GF) of said gauge elements by the equation $$\Delta T = \frac{\epsilon_{app} \cdot GF}{\alpha} = \frac{1}{\alpha}\left(\frac{\Delta V_{34}}{V_{34}} - \frac{\Delta V_{23}}{V_{23}} + \frac{\Delta V_{12}}{V_{12}}\right);$$

wherein $\alpha = TCR + (\beta_s - \beta_g) \times GF$, and $V_{34}$, $V_{23}$, $V_{12}$ are the respective voltages across said points on said sensor, when said sensor system is connected to a constant current power source.

* * * * *